UNITED STATES PATENT OFFICE.

RICHARD FRIEDRICH, OF GLÖSA, NEAR CHEMNITZ, GERMANY, AND FRIEDRICH HIRSCH, OF VIENNA, AUSTRIA-HUNGARY.

PROCESS OF MANUFACTURE OF SOLID SULFITES OR BISULFITES OF HOMOGENEOUS CHEMICAL CONSTITUTION.

1,091,325. Specification of Letters Patent. Patented Mar. 24, 1914.

No Drawing. Original application filed October 31, 1910, Serial No. 589,999. Divided and this application filed November 14, 1913. Serial No. 801,089.

*To all whom it may concern:*

Be it known that we, RICHARD FRIEDRICH, Ph. D., chemist, and FRIEDRICH HIRSCH, Ph. D., chemist, subjects, respectively, of the King of Prussia and the Emperor of Austria-Hungary, residing, respectively, at Glösa, near Chemnitz, Germany, and Praterstrasse 33, Vienna, III, Austria-Hungary, have invented certain new and useful Improvements in Processes of Manufacture of Solid Sulfites or Bisulfites of Homogeneous Chemical Constitution, of which the following is a specification.

The subject of our patent application Serial No. 589,999, filed Oct. 31, 1910, of which this application is a division, is a process for the manufacture of solid sulfites or bisulfites of homogeneous chemical constitution from raw materials which are capable of forming sulfites by the action of sulfurous acid. In said process the raw material in a crushed state and containing a predetermined quantity of water according to the sulfite to be produced is moved in one direction, and a current of sulfurous acid gas is caused to flow in an opposite direction and meet the raw material. The quantity of water is so calculated, that the heat of the reaction will evaporate only a part of the water. The sulfites and bisulfites produced in such a manner are especially suitable for use in the production of other chemical compounds, because they are readily soluble in water; they are however not stable for a longer time.

The purpose of the present invention is to remove this latter disadvantage.

According to this invention the quantity of the water incorporated in the raw material is so calculated that the heat of reaction will evaporate all the water, so that the product will exhibit the required degree of dryness. The sulfites or bisulfites produced in such manner can be preserved for an indefinite time without decomposing.

The apparatus used for carrying this process into practice is the same as illustrated in our patent application Ser. No. 589,999.

In order to explain how the process may be carried into practice the following examples will serve: Sodium pyrosulfite is made from neutral sodium sulfite according to our invention as follows: The neutral sodium sulfite used as starting material had the following composition:

| Found. | Calculated. |
|---|---|
| $SO_2$  43.30% | 43.30% |
| $Na_2O$ _____ | 42.00%, i. e. 85.30% $Na_2SO_3$ |
| $SO_3$  3.48% | 3.48% |
| $Na_2O$ _____ | 2.42%, i. e. 6.30% $Na_2SO_4$ |
| $H_2O$  7.90% | i. e. 7.90% $H_2O$ |

The sulfite was continuously fed through the conical drum provided with longitudinal ribs to its narrow end, while the sulfurous acid entered at the wide end. The percentage of sulfurous acid in this gas was on an average 14.2 vol. % at the inlet and 0.15 vol. % at the outlet.

Tests were taken from the material continuously issuing from the apparatus which had the following percentage of sulfurous acid:

| Time. | Total $SO_2$. | Bound $SO_2$. | Semibound $SO_2$. |
|---|---|---|---|
| 9 h. 5 m. | 61.50% | 30.90% | 30.60% |
| 9 h. 15 m. | 60.32% | 30.25% | 30.07% |
| 9 h. 25 m. | 61.90% | 31.20% | 30.70% |
| 9 h. 35 m. | 62.22% | 30.80% | 31.42% |
| 9 h. 45 m. | 62.10% | 31.10% | 31.00% |
| 10 h. 5 m. | 62.30% | 31.15% | 31.15% |
| 10 h. 45 m. | 61.90% | 30.90% | 31.00% |
| 11 h. 45 m. | 61.90% | 31.50% | 30.40% |

This percentage in the powdered material is the percentage of the best kinds of salable sodium pyrosulfite. The average of the tests obtained was, however, analyzed and gave the following results:

| Found. | Calculated. |
|---|---|
| 61.48% total $SO_2$ | 61.20% $SO_2$ |
| 30.88% bound $SO_2$ | 29.78% $Na_2O$, 90.98% $Na_2S_2O_5$ |
| 30.60% semibound $SO_2$ | 0.28% $SO_3$ |
| 4.33% $SO_3$ | 0.27% $Na_2O$, 0.55% $Na_2SO_3$, 4.33% $SO_3$, 7.69% $Na_2SO_4$ |
| 0.90% water | 0.90% $H_2O$, 0.90% $H_2O$ |

What we claim is:

A process for the manufacture of solid sulfites or bisulfites of homogeneous chemical constitution from raw materials which are capable of forming sulfites by the action of sulfurous acid gas, which consists in continuously imparting an advance movement in one direction to the raw material containing a predetermined quantity of incorporated water therewith in a solid crushed state, and causing a current of sulfurous acid gas flowing in the opposite direction to meet the raw material, the quantity of water used being so calculated that the heat of the reaction will evaporate all the water so that the finished product will exhibit the required degree of dryness, the velocity with which the raw material and the sulfurous acid gas are brought into mutual contact also being regulated so that the finished product will also exhibit the desired content of sulfurous acid.

In testimony whereof I have hereunto set my hand in presence of two subscribing witnesses.

Dr. RICHARD FRIEDRICH.

Witnesses:
E. KILBOURNE FOOTE,
HANS MICKE.

In testimony whereof I affix my signature in presence of two witnesses.

Dr. FRIEDRICH HIRSCH.

Witnesses:
AUGUST FUGGER,
ADA MARION BERGE.